United States Patent
Aydelott et al.

(10) Patent No.: US 10,585,693 B2
(45) Date of Patent: Mar. 10, 2020

(54) SYSTEMS AND METHODS FOR METRIC DRIVEN DEPLOYMENTS TO CLOUD SERVICE PROVIDERS

(71) Applicant: UCHICAGO ARGONNE, LLC, Chicago, IL (US)

(72) Inventors: Ryan Aydelott, Chicago, IL (US); Daniel Murphy-Olson, Woodridge, IL (US); Sebastien Boisvert, Downers Grove, IL (US)

(73) Assignee: UChicago Argonne, LLC, Chicago, IL (US)

( * ) Notice: Subject to any disclaimer, the term of this patent is extended or adjusted under 35 U.S.C. 154(b) by 153 days.

(21) Appl. No.: 15/681,167

(22) Filed: Aug. 18, 2017

(65) Prior Publication Data

US 2018/0095778 A1   Apr. 5, 2018

Related U.S. Application Data (60) Provisional application No. 62/402,959, filed on Sep. 30, 2016.

(51) Int. Cl.
*G06F 9/455* (2018.01)
*H04L 12/26* (2006.01)
(Continued)

(52) U.S. Cl.
CPC ..... *G06F 9/45558* (2013.01); *G06Q 10/0637* (2013.01); *H04L 43/04* (2013.01);
(Continued)

(58) Field of Classification Search
CPC ........ G06F 9/20; G06F 9/5011; G06F 9/5072; G06F 9/5088; G06F 9/45558; G06F 8/20; G06F 8/60; G06F 8/70
(Continued)

(56) References Cited

U.S. PATENT DOCUMENTS 7,092,985 B2    8/2006  Hubbard
9,462,427 B2 *  10/2016 Patel ...................... H04L 67/16
(Continued)

FOREIGN PATENT DOCUMENTS

WO    WO-2015/184459    12/2015

OTHER PUBLICATIONS

Salah T, Zemerly MJ, Yeun CY, Al-Qutayri M, Al-Hammadi Y. Performance comparison between container-based and VM-based services. In2017 20th Conference on Innovations in Clouds, Internet and Networks (ICIN) Mar. 7, 2017 (pp. 185-190). IEEE. (Year: 2017).*

(Continued)

*Primary Examiner* — James N Fiorillo
(74) *Attorney, Agent, or Firm* — Foley & Lardner LLP (57) ABSTRACT

Systems and methods are shown for providing metric driven deployments to cloud server services that are adapted to interface with each provider. In some implementations, there is insight and control over network, disk, CPU, and other activity giving the ability to do performance metrics analysis for a given application or service between different cloud server services as each application or service is run in a container within an instance running on the respective cloud server service. This allows for comparison between a plurality of providers for a given container driven by one or more metrics such as cost, flexibility, and performance. The instances which runs the one or more containers can be scaled up and down to a desired workload performance. Replication of images between providers can allow for seamless changing between providers based on changing goals as well as distribution of workload.

17 Claims, 8 Drawing Sheets

(51) Int. Cl.
    *G06Q 10/06*     (2012.01)
    *H04L 12/24*     (2006.01)
    *G06F 9/50*     (2006.01)

(52) U.S. Cl.
    CPC .... *G06F 9/5077* (2013.01); *G06F 2009/4557* (2013.01); *H04L 41/5096* (2013.01)

(58) Field of Classification Search
    USPC ........................................ 709/201, 223, 224
    See application file for complete search history.

(56) References Cited

U.S. PATENT DOCUMENTS

| | | | | |
|---|---|---|---|---|
| 10,108,465 | B1* | 10/2018 | Gaudlip | G06F 9/5088 |
| 2012/0096149 | A1* | 4/2012 | Sunkara | G06F 9/5072 |
| | | | | 709/224 |
| 2012/0137001 | A1 | 5/2012 | Ferris et al. | |
| 2013/0262646 | A1* | 10/2013 | Fiebig | G06F 8/60 |
| | | | | 709/223 |
| 2014/0317166 | A1 | 10/2014 | Iyoob et al. | |
| 2015/0169291 | A1* | 6/2015 | Dube | G06F 8/20 |
| | | | | 717/101 |
| 2015/0312110 | A1 | 10/2015 | Dube et al. | |
| 2015/0341240 | A1* | 11/2015 | Iyoob | H04L 43/08 |
| | | | | 709/201 |
| 2016/0065417 | A1* | 3/2016 | Sapuram | G06Q 30/0631 |
| | | | | 709/223 |
| 2016/0142261 | A1* | 5/2016 | Huang | G06F 3/0647 |
| | | | | 709/223 |
| 2016/0142265 | A1* | 5/2016 | Dube | G06F 8/20 |
| | | | | 709/223 |
| 2016/0162823 | A1* | 6/2016 | Gujar | G06Q 30/0631 |
| | | | | 705/7.25 |
| 2017/0192825 | A1* | 7/2017 | Biberman | G06F 9/5072 |
| 2018/0285165 | A1* | 10/2018 | Helsley | G06F 9/5077 |
| 2018/0287903 | A1* | 10/2018 | Joshi | H04L 67/10 |
| 2018/0288129 | A1* | 10/2018 | Joshi | H04L 43/08 |
| 2018/0300116 | A1* | 10/2018 | Meytin | G06F 8/60 |
| 2019/0018671 | A1* | 1/2019 | Zhu | H04L 67/1008 |
| 2019/0171438 | A1* | 6/2019 | Franchitti | G06F 8/65 |

OTHER PUBLICATIONS

Iosup A, Ostermann S, Yigitbasi MN, Prodan R, Fahringer T, Epema D. Performance analysis of cloud computing services for many-tasks scientific computing. IEEE Transactions on Parallel and Distributed systems. Feb. 24, 2011;22(6):931-45. (Year: 2011).*
International Search Report from related PCT Application Publication No. WO2018/063574, dated Oct. 25, 2017, pp. 1-2.
Written Opinion from related PCT Application Publication No. WO2018/063574, dated Oct. 25, 2017, pp. 1-12.

* cited by examiner

SYSTEMS AND METHODS FOR METRIC DRIVEN DEPLOYMENTS TO CLOUD SERVICE PROVIDERS

CROSS-REFERENCE TO RELATED APPLICATIONS

This application claims the benefit of U.S. Provisional Patent Application No. 62/402,959 filed Sep. 30, 2016, the content of which is herein incorporated by reference in its entirety.

BACKGROUND

In a networked environment, such as the Internet or other networks, content providers can provide information for public presentation on resources, for example web pages, documents, applications, and/or other resources. The first-party content can include text, video, and/or audio information provided by the first-party content providers via, for example, a resource server for presentation on a user device, such as a mobile device, over the Internet. Some content providers are using cloud solution providers for storage, to serve the first-party content, to execute software as a service (SaaS), execute other Cloud software, and to manage content such as application data. Comparisons between cloud solution providers can be difficult, particularly with changing workloads, cost goals, and performance goals.

SUMMARY

One implementation relates to a method of transmitting a plurality of deployments to a plurality of cloud server services. Each deployment is adapted for executing using the cloud server service to which it is deployed. Each of the plurality of deployments comprises instructions that when executed cause the cloud server service to create a container running using the respective cloud server service, receive a request comprising information associated with the deployment, and update a parameter associated with the deployment based on the received request. The method further comprises receiving a first request comprising information associated with changing one or more of the plurality of deployments, determining one or more of the plurality of deployment to change based on the first request, and transmitting a respective request to the one or more of the plurality of deployments based on the determining. In some implementations determining the one or more of the plurality of deployments to change based on the first request comprises application of a machine learning algorithm to the first request. The respective request to the one or more of the plurality of deployments comprises information associated with updating the respective parameter associated with the respective deployment.

Another implementation relates to a system running on one or more processors of a device with a network interface and a computer storage device, with the computer storage device storing instructions, when executed by the one or more processors, cause the one or more processors to perform operations. The operations comprise transmitting a plurality of deployments to a plurality of cloud server services. Each deployment is adapted for executing using the cloud server service to which it is deployed. Each of the plurality of deployments comprises a metrics repository, an analytic module comprising instructions that when executed create a container running on the respective cloud server service, and an inter-cloud routing module. Each analytic module further comprises instructions that when executed cause the analytic module to receive a request comprising information associated with the respective container, analyze the received request comprising information associated with the respective container using at least one metric from the respective metrics repository, and transmit information associated with the received request, using the respective inter-cloud routing module, to a different deployment of the plurality of deployments than the respective deployment based on the analysis of the received request. The operations further comprise receiving a first request comprising information associated with a respective container associated with one of the plurality of deployments and transmitting the first request comprising information to the one plurality of deployments associated with the respective container.

Another implementation relates to a non-transitory computer-readable medium having stored computer-executable instructions that, when executed by one or more processors of a computer system cause the computer system to perform a process. The process comprises transmitting a plurality of deployments to a plurality of cloud server services. Each deployment is adapted for executing using the cloud server service to which it is deployed. Each of the plurality of deployments comprises a metrics repository, an analytic module comprising instructions that when executed create a container running on the respective cloud server service, and an inter-cloud routing module. Each analytic module further comprises instructions that when executed cause the analytic module to receive a request comprising information associated with the respective container, analyze the received request comprising information associated with the respective container using at least one metric from the respective metrics repository, and transmit information associated with the received request, using the respective inter-cloud routing module, to a different deployment of the plurality of deployments than the respective deployment based on the analysis of the received request. The process further comprises receiving a first request comprising information associated with a respective container associated with one of the plurality of deployments and transmitting the first request comprising information to the one plurality of deployments associated with the respective container.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

DETAILED DESCRIPTION

Following below are more detailed descriptions of various concepts related to, and implementations of, methods, apparatuses, and systems for providing private local sponsored content. The various concepts introduced above and discussed in greater detail below may be implemented in any of numerous ways, as the described concepts are not limited to any particular manner of implementation. Specific implementations, embodiments, and applications are provided primarily for illustrative purposes.

In some instances, systems and methods for metric driven deployments to cloud server services are desirable as each deployment is adapted to the cloud server service that it is deployed to and can run an instance over which there can be insight and control. In some implementations there is insight and control over network, disk, CPU, and other activity giving the ability to do performance metrics analysis for a given application or service between different cloud server services as each application or service is run in a container within an instance running on the respective cloud server service. This allows for comparison between a plurality of cloud server services for a given container driven by one or more metrics such as cost, flexibility, performance, reliability, and technical specifications. In some implementations, monitoring and filtering between the application or service and the cloud server service can also be accomplished by the instance as the container(s) are within the instance. In some implementations, the instance which runs the one or more containers can be scaled up and down to a desired workload performance. In some implementations, the instance can be modified through parameters such as bandwidth, latency, processing capability, and/or computer memory and the like. The workload performance or estimated workload performance may be determined through an evaluation of historical workload performance for the respective container. In some implementations, switching between cloud server services may be seamless and transparent to a customer based on changing needs, requests, or goals. The cloud server services may be a combination of private and public cloud server services. In some implementations, a specific workload can be run simultaneously across different cloud server services. An analysis may be done of metrics such as cost, performance, reliability and time to deliver expected results for a single cloud server services or when spreading a workload across different cloud server services. Certain needs or goals (e.g., cost against performance, cost against time to delivery, etc.) may be prioritized when doing the analysis. In some implementations, switching of workloads and/or scaling of instances may be accomplished using machine learning algorithms to help manage diverse cloud workloads. In some implementations, switching may be done in instances of changing resource availability or as part of a disaster recovery model when a cloud server service becomes partially or entirely unavailable.

In some implementations, the overall management of all the deployments will leverage a metric repository and an analytics engine. Each deployment will have access to its own data, and own logic, but the overall system will be able to leverage the aggregated data and learnings derived from the analytics done on the data. The deployments are deployed, configured, and updated as needed based on the application of the learnings (e.g., machine learning) on data provided by both the user and the system. In some implementations, the deployments are constantly coordinating with a central system (e.g., central server or other computer) to collect and analyze data in order to improve the machine model and/or machine learning algorithms as well as metrics associated with the cloud server services running the deployments. The central server may in some instances also be running on a cloud server service.

Figure 1:
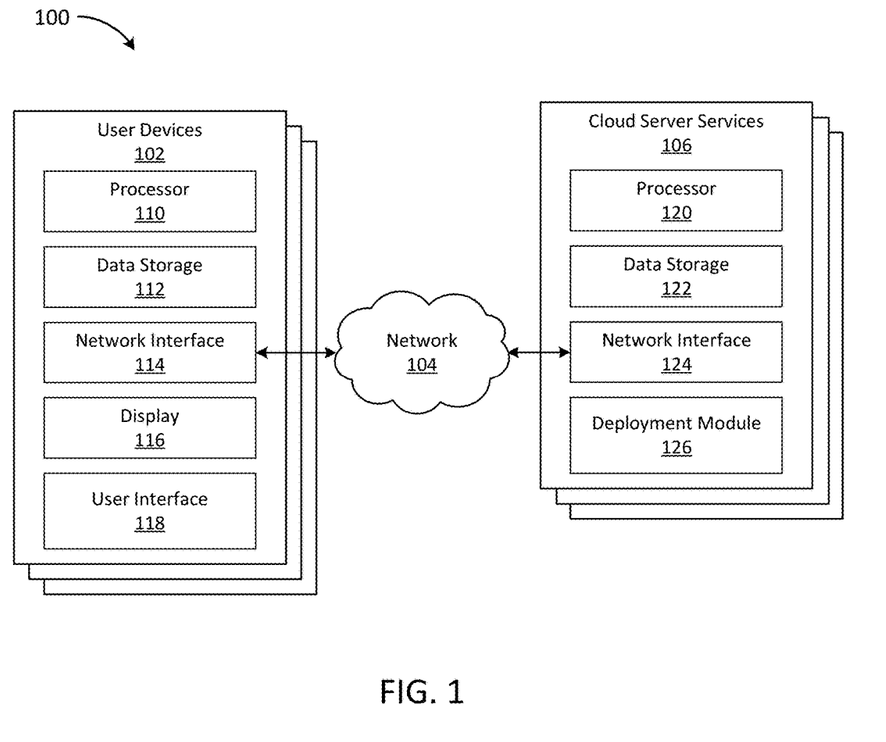
FIG. 1 is a block diagram depicting an embodiment of an environment that may be used for metric driven deployments to cloud server services.

Prior to discussing the specifics of implementations of the systems and methods for providing deployments to cloud server services, it may be helpful to discuss an implementation of an environment where such systems and methods may be deployed. FIG. 1 depicts one implementation of an environment 100. In brief overview, the environment 100 comprises user devices 101, communicating over a network 104 to cloud server services 106. The user devices 102 may be any number of different types of business, personal and mobile electronic devices configured to communicate via the network 104 (e.g., a server, a desktop computer, a laptop computer, a tablet computer, a smartphone, combinations thereof, etc.).

The network 104 may be any form of computer network that relays information between the user devices 102 and the cloud server services 106. In some implementations, the network 104 may include the Internet and/or other types of data networks, such as a local area network (LAN), a wide area network (WAN), a cellular network, satellite network, or other types of data networks. The network 104 may also include any number of additional computing devices (e.g., computers, servers, routers, network switches, smartphones, tablets, mobile phones, etc.) that are configured to receive and/or transmit data within the network 104. These devices may aid connection to the network and may further use wireless communication methods such as a BLUETOOTH transceiver, a BLUETOOTH beacon, an RFID transceiver, Near Field Communication (NFC) transmitter or other similar technologies known in the art. The network 104 may further include any number of hardwired and/or wireless connections. For example, the user devices 102 may communicate wirelessly (e.g., via WiFi, cellular, radio, etc.) with a transceiver that is hardwired (e.g., via a fiber optic cable, a CAT5 cable, etc.) to other computing devices for communication over the network 104 to communicate with the cloud server services 106. In some implementations, reliable communication methods are used over the network with acknowledgment and resend if there is no acknowledgment received.

Still referring to FIG. 1, the user devices 102 as depicted include a processor 110 and data storage 112. The data storage 112 may store machine instructions that, when executed by the processor 110, cause the processor 110 to perform one or more of the operations described herein. The processor 110 may include one or more microprocessors, application specific integrated circuits (ASICs), field programmable gate arrays (FPGAs), other forms of processing circuits, or combinations thereof. The data storage 112 may include, but is not limited to, electronic, optical, magnetic, or any other storage or transmission device capable of providing the processor 110 with program instructions. The data storage 112 may include storage devices such as a floppy disk, CD-ROM, DVD, magnetic disk, memory chip, ROM, RAM, EEPROM, EPROM, flash memory, optical media, or any other suitable memory from which the processor 110 can read instructions and/or data. The processor 110 and the data storage 112 may form a processing module. The data storage 112 may include files to run an operating system and a user interface 118.

The user devices 102 are shown to include a network interface 114. In some implementations, the network interface 114 is a hardware interface allowing data to pass to and from the network 104 (e.g., the internet). In some implementations, the network interface 114 includes the hardware and logic necessary to communicate over multiple channels of data communication. For example, the network interface 114 may include an Ethernet transceiver, a cellular modem, a BLUETOOTH transceiver, a BLUETOOTH beacon, an RFID transceiver, and/or an NFC transmitter. Data passing through the network interface 114 may be encrypted such that the network interface 114 is a secure communication module.

The user devices 102 include a display 116. In some implementations, the display 116 is combined with a user input device in the form of a touchscreen device. The display may be any electronic device that conveys data to a user by generating sensory information (e.g., a visualization, sounds, etc.). The display 116 may be internal to the housing of the mobile device 104 (e.g., a built-in display) or external to the housing of the mobile device 104 (e.g., a monitor connected to the mobile device 104), according to various implementations. For example, the mobile device 104 may include a display 116, which may display webpages, user interfaces for applications, and/or other visual sources of information. In various implementations, the display 116 may be located inside or outside of the same housing as that of the processor 110 and/or the data storage 112. For example, the display 116 may be an external display, such as a computer monitor or any other stand-alone form of electronic display. In other examples, the display 116 may be integrated into the housing of a laptop computer, mobile device, smartphone, tablet, or other form of computing device having an integrated display.

The user devices 102 are shown to include a user interface 118. In some implementations, the user interface 118 is a web based application. The web based application may include an application programming interface (API) for customer access. In some implementations, the user interface 118 is configured to allow the input of goals, requirements, and requests regarding cloud server service server provider 106 functionality. In some implementations, the inputs to the user interface 118 are intent driven and inputs comprise intents or desired results (e.g., a cost goal, performance goal, availability goal, etc.) The user interface 118 is configured to transmit these inputs using the network interface 114 via the network 104 to a cloud server service 106. In some implementations, the user interface 118 is configured to transmit the inputs to a standalone server. In some implementations, the user interface 118 is configured to display a status to a user of the user interface 118 (e.g., a customer with active deployments). The displayed status may be default elements indicating status of various elements of the deployment, customized elements chosen by the user, and/or a combination of default elements plus chosen customized elements. Elements shown may include total data transmitted, number of times certain databases were accessed and/or updated, estimated electricity utilization, number of deployments for each provider, real time status of a deployment in progress, and the like.

The cloud server services 106 as depicted include a processor 120, data storage 122, and a network interface 124. The data storage 122 may store machine instructions that, when executed by the processor 120, cause the processor 120 to perform one or more of the operations described herein. The processor 120 may include one or more microprocessors, application specific integrated circuits (ASICs), field programmable gate arrays (FPGAs), other forms of processing circuits, or combinations thereof. The data storage 122 may include, but is not limited to, electronic, optical, magnetic, or any other storage or transmission device capable of providing the processor 120 with program instructions. The data storage 122 may include storage devices such as a floppy disk, CD-ROM, DVD, magnetic disk, memory chip, ROM, RAM, EEPROM, EPROM, flash memory, optical media, or any other suitable memory from which the processor 120 can read instructions. The processor 120 and the data storage 122 may form a processing module. The data storage 122 may include files to run an operating system and a deployment module 126.

The cloud server service 106 is shown to include a network interface 124. In some implementations, the network interface 124 is a hardware interface allowing data to pass to and from the network 104 (e.g., the internet). In some implementations, the network interface 124 includes the hardware and logic necessary to communicate over multiple channels of data communication. For example, the network interface 124 may include an Ethernet transceiver, a cellular modem, a BLUETOOTH transceiver, a BLUETOOTH beacon, an RFID transceiver, and/or an NFC transmitter. Data passing through the network interface 124 may be encrypted such that the network interface 124 is a secure communication module.

The cloud server service 106 is shown to include a deployment module 126. In some implementations, the deployment module 126 is configured to function as an analytical module, a machine learning module, a metrics repository, and an image repository. In some implementations, the analytical module, the machine learning module, the metrics repository, and/or the image repository are configured to run on a standalone and/or private server. In some implementations, the deployment module 126 is created by receiving a deployment configured to execute on a cloud server service 106 to create an instance. The instance is adapted to the cloud server service 106 and configured so that there can be insight and control over the specifications of the instance. In some implementations, the instances are configured so there is insight and control over network, disk, CPU, and other activity giving the ability to do performance metrics analysis for a given application or service or other software running within the instance.

In some implementations, one or more features or functionality of the deployment module 126 may be done on a separate computer system (e.g., a standalone server) than the cloud server services 106 that is configured to send the results of the of the feature or functionality to one or more cloud server services 106.

Figure 2:
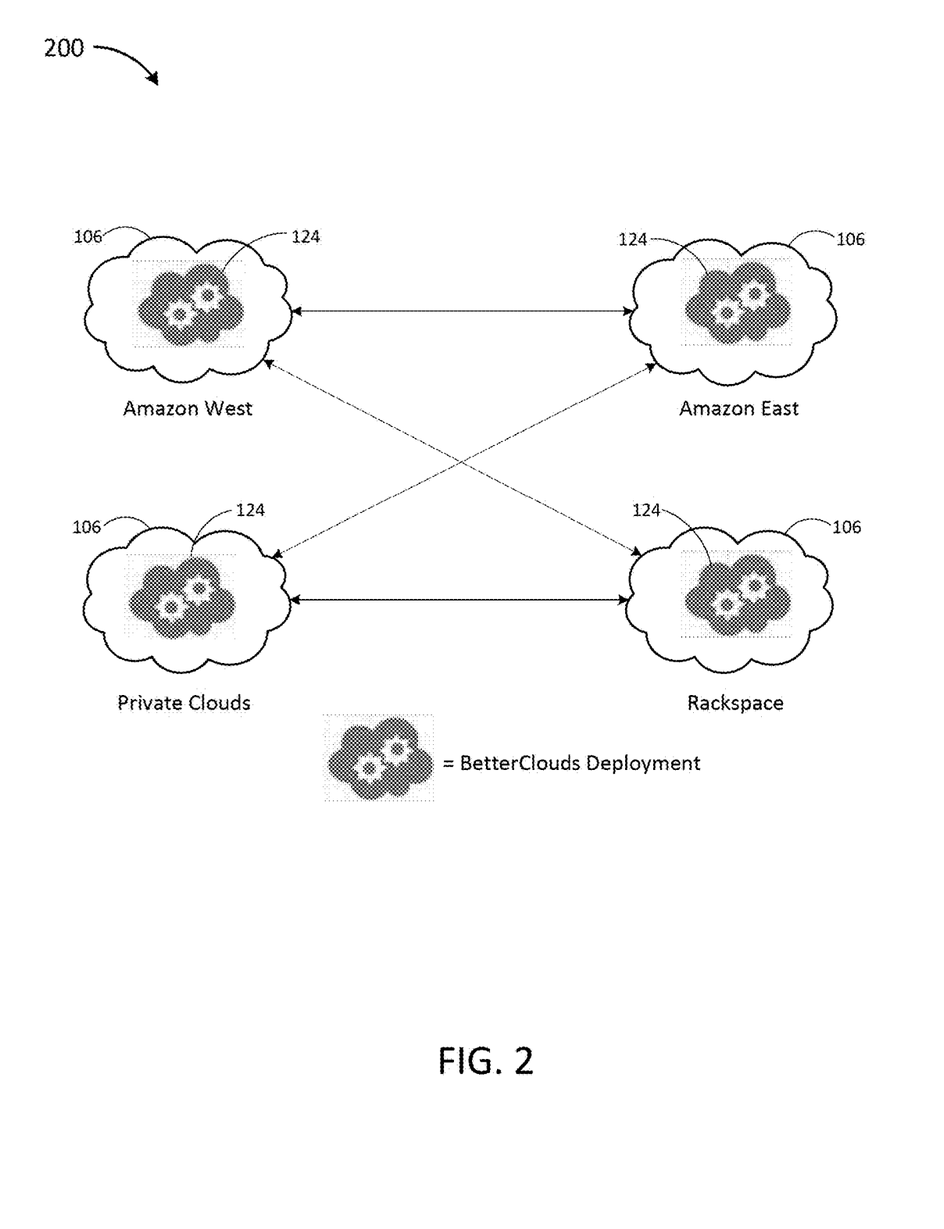
FIG. 2 is a block diagram depicting an example implementation of deployment on a plurality of cloud server services including private clouds.

Referring now to FIG. 2, a block diagram 200 of an example implementation of deployment modules 126 on four different cloud server services 106 is depicted. In this example implementation, one of the cloud server services 106 is a private cloud server service (e.g., a standalone server system) and the other three are 'Amazon West,' 'Amazon East,' and 'Rackspace' with the deployment modules 126 referred to as BetterClouds Deployment. Each BetterClouds Deployment as illustrated can communicate over a network 104 with each of the others. In some implementations, the deployment modules 126 are configured to transmit requests, needs, instructions and/or goals to one or more of the other deployment modules 126. In some implementations, the deployment modules 126 are configured to transmit and/or synchronize images associated with customer containers containing data storage, applications, services, and the like. The synchronizing of images may occur automatically when there is a change to an image, occur periodically, or occur upon a received request. The synchronization of images may occur between any two or more of a plurality of different cloud server services 106.

Figure 3:
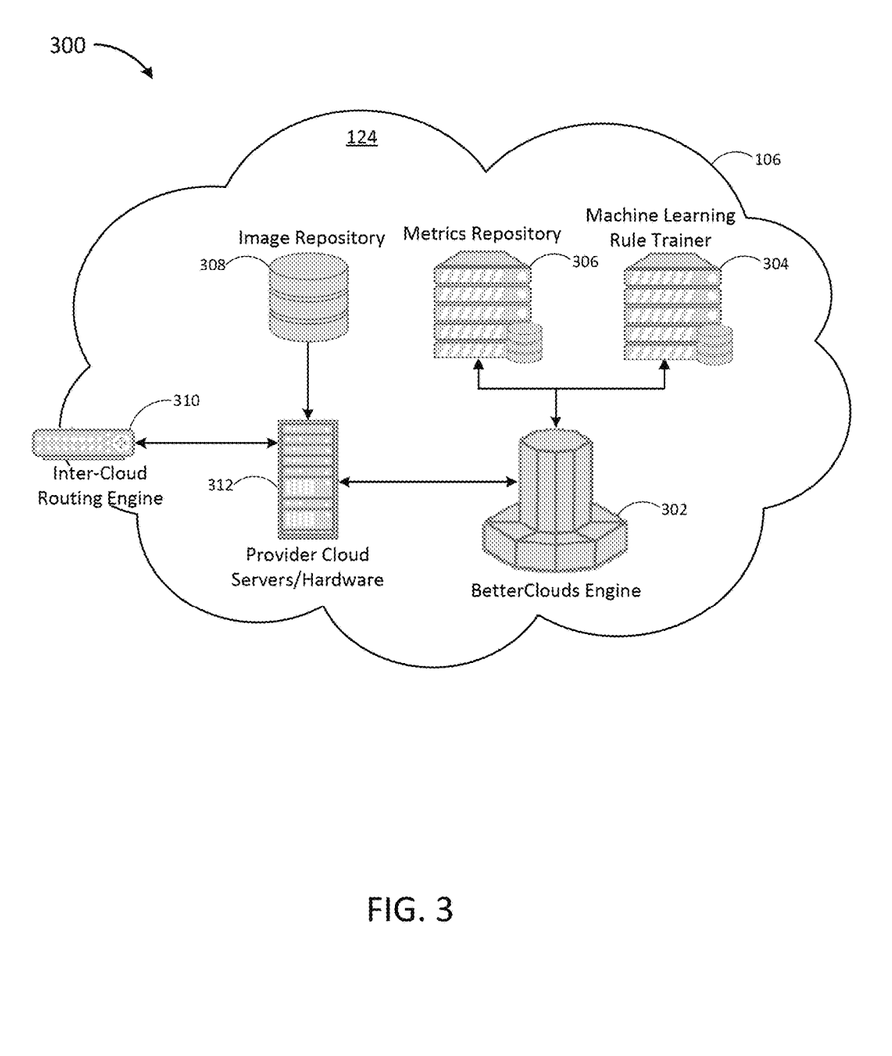
FIG. 3 is a block diagram depicting an embodiment of a deployment running on the servers and hardware of a cloud server service.

Referring now to FIG. 3, a block diagram 300 of an example embodiment of a deployment running on the servers and hardware of a cloud server service 106. In this example implementation, the deployment comprises an analytical module 302, a machine learning rule trainer module 304, a metrics repository 306, an image repository 308, an inter-cloud routing module 310, one or more of which running on Provider Cloud Servers/Hardware 312. In some implementations, the analytical module 302 is configured to interface with a respective cloud server service 106 to evaluate running a customer container based on metrics. The analytical module 302 may be configured to automatically adapt to an interface across a plurality of cloud server services 106. In some implementations, the analytical module 302 uses multiple algorithmic decision trees to measure metrics associated with a given container running on a respective cloud server service 106. In some implementations, metrics include one or more of cost, performance, time to deliver expected results, flexibility, reliability, technical specifications needed and the like. In some implementations, the analytical module 302 is configured to improve in functionality as more data is received correlating goals associated with the respective deployments with the metrics associated with the various cloud server services 106. In some implementations, the analytical module 302 is configured to use plug-in architecture to allow it to be customized to the requirements of a workload associated with a customer container. The plug-in architecture may be further associated with the performance metrics where the architecture is automatically reconfigured based on the received goals, needs and/or requests for the respective deployments using the modules of the plug-in architecture. In some implementations, the analytical module 302 is configured to allow workloads to be scheduled across different cloud server services 106 in a comparative fashion. In some implementations, the analytical module 302 is an analytics engine (i.e., analytics module) and executes algorithms, applies logic, and incorporates machine learning results based on data received by the system in order to improve the functionality of the analytical module 302 as the received data improves.

Continuing with FIG. 3, the deployment is shown to contain a machine learning rule trainer module 304. In some implementations, the machine learning rule trainer module 304 is configured to automatically manage workloads across different cloud server services 106. In some implementations, the machine learning rule trainer module 304 comprises rules and parameters. The rules and parameters may be associated with scaling instances up or down, switching a container to a different cloud server service 106, distributing workload to a plurality of containers in a single cloud server service 106, or distributing workload across a plurality of containers in a plurality of cloud server services 106. In some implementations, the machine learning rule trainer module 304 accesses historical data related to past cost and performance associated with customer images. In some implementations, the machine learning rule trainer module 304 stores and applies weights to some or all parameters which may be adjusted based on historical data and received requests, needs, and/or goals.

The deployment is shown to contain a metrics repository 306. In some implementations, the metrics repository 306 is configured to store metrics associated with one or more with customer containers. In some implementations, metrics may include costs associated with the cloud server service 106. Costs may vary depending on type and level of service required from the cloud server service 106. In some implementations, the metrics include costs associated with any cloud server service 106 currently containing a deployment. In some implementations, metrics also include performance values associated with the cloud server service 106, historical performance values, predicted performance values, predicted time to deliver expected results, and the like.

The deployment is shown to contain an image repository 308. In some implementations, the image repository 308 is configured to store images of customer containers 404. Different versions of each customer container may be stored associated with different metrics and/or different plug-in architecture. In some implementations, the images stored in the image repository 308 are used to load customer container 404 architectures on to the respective cloud server service.

The deployment is shown to contain an inter-cloud routing module 310. In some implementations, the inter-cloud routing module 310 is configured to communicate between two or more available deployments on cloud server services 106. In some implementations, the inter-cloud routing module 310 is essentially a signaling agent. In some implementations, instructions, requests, and/or goals that are received by one deployment are forwarded to a different deployment. This may be done when an evaluation of changes to the customer container 404 or the instance containing the customer container 404 are required to fulfill the instruction, request and/or goal and an application of metrics determines another deployment is better suited. In some implementations, the inter-cloud routing module 310 is configured to duplicate customer data (e.g., images) between two or more cloud server services 106. The synchronizing of images or other data may occur automatically when there is a change to an image or other data, occur periodically, or occur upon a received request. The synchronization of images may occur between any two or more of a plurality of different cloud server services 106.

Figure 4:
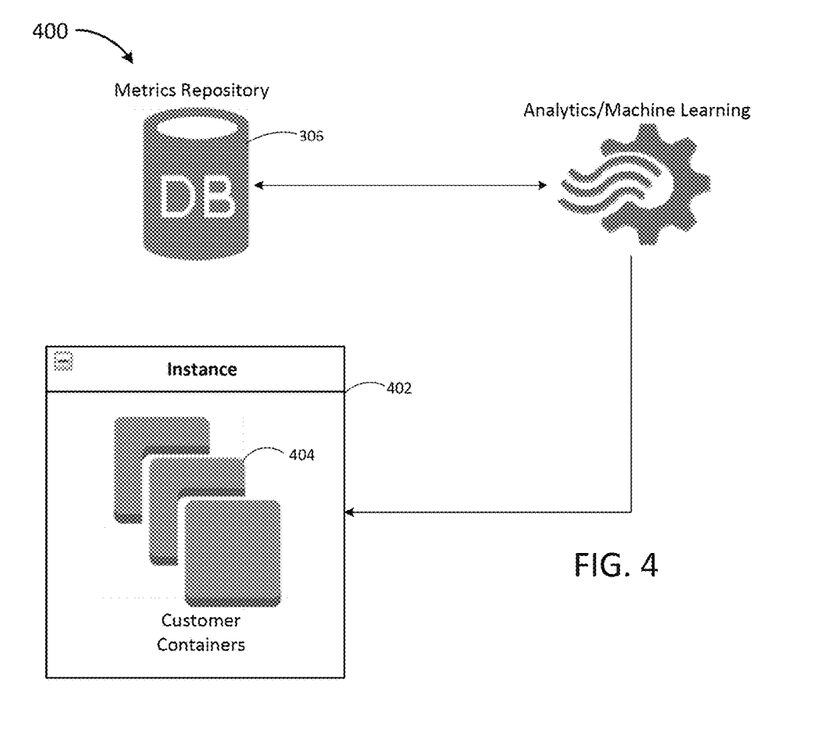
FIG. 4 is a block diagram depicting an embodiment of an instance running on a cloud server service.

Referring now to FIG. 4, a block diagram 400 of an example embodiment of an instance 402 running on a cloud server service 106 (not shown). In this example embodiment, the instance 402 comprises one or more customer containers 404. In some implementations, the instance 402 is a virtual machine. In some implementations, the instance 402 is a physical server. In some implementations, each deployment is adapted to the cloud server service 106 that it is deployed to and can run an instance configured so that there can be insight and control over the specifications of the instance and the data going to and from each customer container 404. In some implementations, the instances 402 are configured so there is insight and control over network, disk, CPU, and other activity giving the ability to do performance metrics analysis for a given application or service or other software running in the customer container 404 between different cloud server services 106 as each application or service is run in a container within an instance running on the respective cloud server service 106. In some implementations, the customer containers 404 are web pages, applications, services, and the like requested by customers needing the functionality of cloud server services. In some implementations, the instances 402 are configured to monitor and filter between the customer containers 404 and the cloud server service. Monitoring and filtering may include elements of security and/or conditional access (e.g., firewalls, intrusion detection, prevention systems, antivirus, etc.). In some implementations, the instance 402 which runs the one or more containers 404 is configured so that it can be scaled up and down to a desired workload performance. The workload performance or estimated workload performance may be determined through an evaluation of historical workload performance for the respective customer container 404. In some implementations, the customer containers 404 are configured to work with modular architecture allowing pluggable feature enhancements if desired (e.g., disaster recovery, automatic load scaling, etc.). For example, this allows load shedding of available instances to better support a static database.

Still referring to FIG. 4, in some implementations, the metrics repository 306 and the Analytics/Machine Learning (encompassing the analytical module 302, the metrics repository 306, and the machine learning rule trainer module 304 of FIG. 3), are contained in a central server or configured to function in as a central unit even if the central unit is also running on a cloud server service. The metrics repository 306 is configured to receive updated data, including updated metrics, from deployments (e.g. regarding the instances 402 and customer containers 404). In some implementations the central server or central unit comprises a routing layer (not shown) along with deployment orchestration and signaling (e.g., an inter-cloud routing module) configured to coordinate deployments and communication between the central server or central unit and the deployments.

Figure 5:
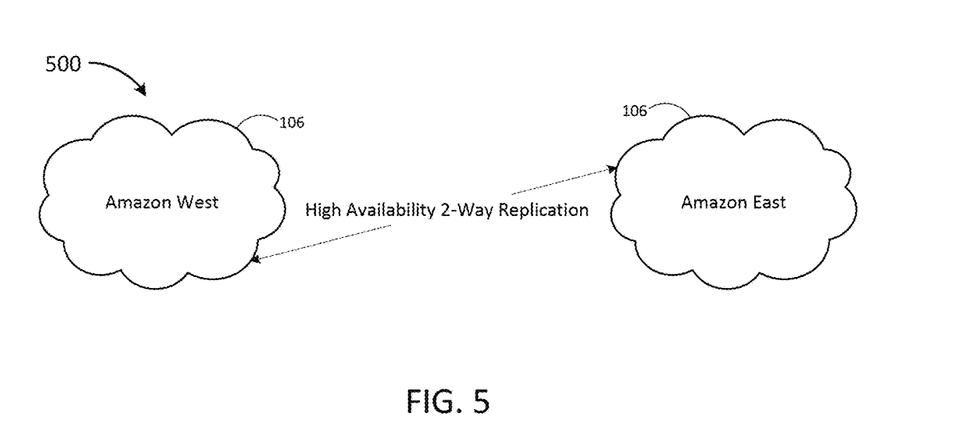
FIG. 5 is a block diagram depicting an embodiment of a deployment on two cloud server services to provide a replication service.

Referring now to FIG. 5, a block diagram 500 of an example embodiment of a deployment using two cloud server services 106 to provide a replication service is depicted. In some implementations, the deployment allows for high availability 2-way replication allowing data to be duplicated on two or more deployments. In some implementations, this may be done for data backup, recovery, and disaster mitigation purposes. In some implementations, the replication of data (e.g., customer images) allows for seamless changing between cloud server services 106 based on changing metrics or changing requests, goals, needs and the like. This also allows for workload balance across two or more cloud server services 106 using the same or similar customer containers. The synchronizing of images may occur automatically when there is a change to an image, occur periodically, or occur upon a received request. The synchronization of images or replication of other data may occur between any two or more of a plurality of different cloud server services 106.

Figure 6:
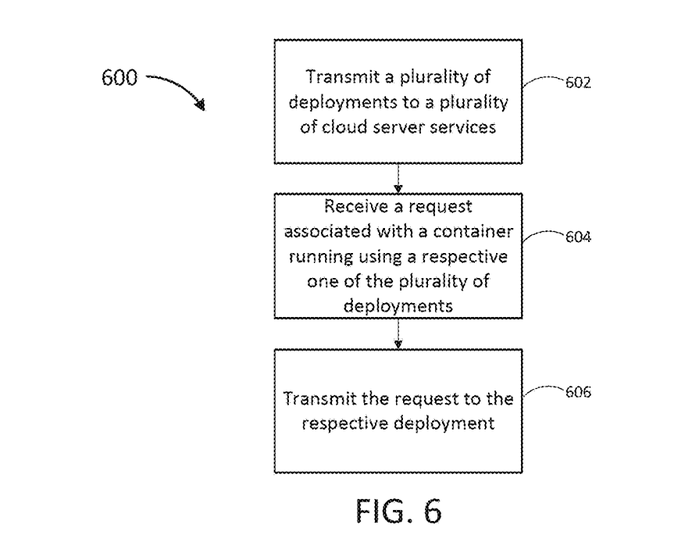
FIG. 6 is a flow diagram depicting a method of transmitting requests to deployments in one example embodiment.

Referring now to FIG. 6, a flow diagram of a method 600 of transmitting requests to deployments in an example embodiment is depicted. In some implementations, the method 600 is performed by a processor 120 running instructions from data storage 122 on a cloud server service 106. While performing the method 600, the cloud server service 106 communicates data over a network interface 124 over a network 104 to another cloud server service 106. In some implementations, the method 600 is performed by a central computing system (e.g., a private server, a private cloud service, public cloud service, some combination of the previous, and the like). In some implementations, the method 600 is performed by a standalone server. In brief overview of method 600, the method 600 comprises transmitting a plurality of deployments to a plurality of cloud server services 106, receiving a request associated with a container running using a respective one of the plurality of deployments, and transmitting the request to the respective deployment.

Still referring to FIG. 6 and in more detail, the method 600 begins with transmitting a plurality of deployments to a plurality of cloud server services 106 at 602. In some implementations, the respective deployments are adapted to the respective cloud server service. In some implementations, a user resource asset allocation module may be used, drawing resources from a data repository and a deployment manifest. A deployment decision engine may incorporate resource provider metrics and deployment manifest rules. In some implementations, application metrics from similar deployment manifests may also be used. In some implementations, the deployment decision engine uses a weighted resource per type/provider table. The table may be ranked from best to worst choices for execution from the decision engine. A resource request is then made upon choosing a provider based on the weighted resource per type table and operating within the confines of the deployment manifest requirements. Upon deployment and execution of the deployment for each resource request based on requirements (e.g., performance), a resource monitor may observe the running state of the deployment(s) to ensure compliance to the original request.

A request associated with a container running using a respective one of the plurality of deployments is received at 604. In some implementations, the request is received from a user device 102 consequent to interaction or input with a user interface 118. In some instances, the request generates a need or requirement to create a container running in an instance on a cloud server service 106. In some instances, the request generates a need or requirement to modify the container or the instance within which the container is running. The request may be a parameter change, desired goal, target metric, and the like.

The request to the respective deployment is transmitted at 606. In some implementations, the request is transmitted to a cloud server service 106 running a deployment. In some implementations, the request is first transmitted to a standalone server or other computer which determines a cloud server service 106 to forward the request.

Figure 7:
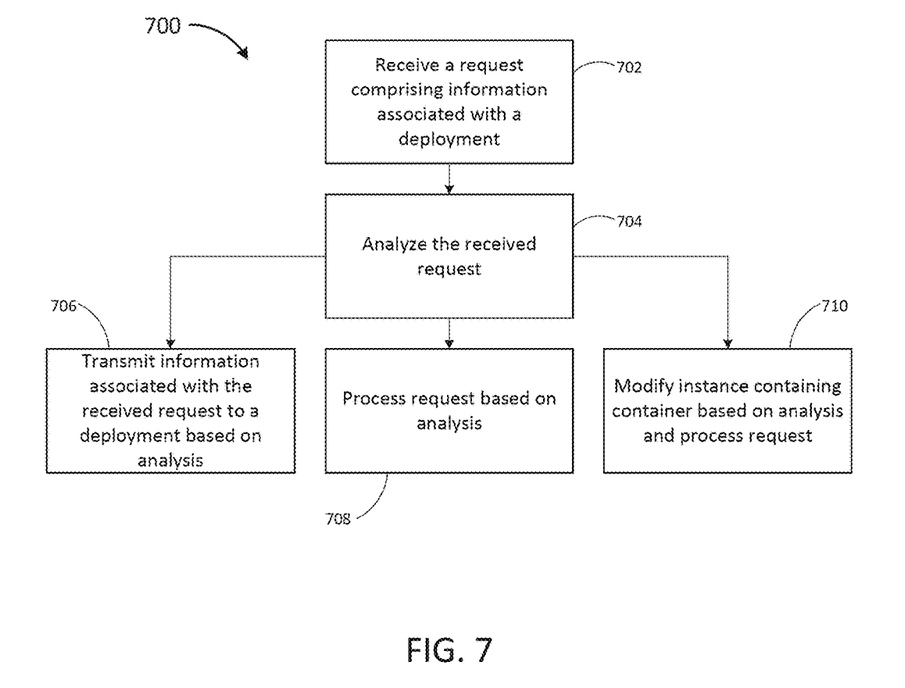
FIG. 7 is a flow diagram depicting a method of receiving a request by a deployment in one example embodiment.

Referring now to FIG. 7, a flow diagram of a method 700 receiving a request by a deployment is depicted in one example embodiment. In some implementations, the method 700 is performed by a processor 120 running instructions from data storage 122 on a cloud server service 106. While performing the method 700, the cloud server service 106 communicates data over a network interface 124 over a network 104 to another cloud server service 106 or a standalone server. In some implementations, the method 700 is performed by a central computing system (e.g., a private server, a private cloud service, public cloud service, some combination of the previous, and the like). In some implementations, the method 600 is performed by a standalone server. In brief overview of method 700, the method 700 comprises receiving a request comprising information associated with a container and analyzing the received request. Based on the analysis, the method 700 comprises one of transmitting information associated with the received request to a different deployment, processing the request, or modifying an instance containing the container based on the analysis and then processing the request.

Still referring to FIG. 7 and in more detail, the method 700 begins with receiving a request comprising information associated with a container at 702. In some implementations, the request is for the creation of a customer container 404 within an instance 402 running on the respective cloud server service. In some instances, the request is to modify the container or the instance within which the container is running. The request may be a parameter change, desired goal, target metric, and the like.

The request is analyzed at 704. In some implementations, the request is analyzed using at least one metric from a metrics repository. In some implementations, the request is analyzed using multiple algorithmic decision trees to measure metrics associated with a given container running on a respective cloud server service 106 and compare to the requirements of the request. In some implementations, metrics include one or more of cost, performance, time to deliver expected results and the like. In some implementations the metrics for a plurality of deployments on cloud server services 106 are available and used to determine which deployment is best suited to fulfill the request. In some cases, the request may result in workload scheduled across a plurality of cloud server services 106 to fulfill the request and to maximize one or more metrics associated with the container 404 of the customer. For example, upon analysis, there is a determination, that cost is minimized while still meeting a performance level contained in a request if the workload of a customer container is spread across two different cloud server services 106.

Based on the analysis, the method 700 may continue by transmitting information associated with the received request to a deployment at 706. This may be done upon analyzing the received request. In some instances, a duplicate or similar version of a customer container associated with the request is already present on a deployment on a cloud server service 106 and the received request is forwarded on to the cloud server service 106. In some instances, an image of the customer container must first be transmitted to the cloud server service 106. In some instances, upon analysis, a determination is made to share the workload between two or more deployments on different cloud server services and the request is forwarded with additional information on how to balance the workload.

Based on the analysis, the method 700 may instead continue processing the request at 710. In some instances, upon completion of the analysis, a determination is made to continue to process the request using the cloud server service 106 or standalone computer system running the method 700 where the request is received. In that instance, the request is processed and not forwarded to any other deployments on other cloud server services 106. In some implementations, the request is forwarded to a plurality of deployments on cloud server services 106 and data is received back by each of the deployments from each of the other deployments based on their respective analysis of the request before a decision is made about which deployment is used to service the request.

Based on the analysis, the method 700 may instead continue by modifying an instance containing the container based on the analysis and then processing the request at 712. In some instances, there may be a determination based on the analysis to use a deployment on a cloud server service 106 to service the request, but a modification to the instance containing a container associated with the request must first be modified (e.g., scaled up or down) prior to fulfilling the request.

Figure 8:
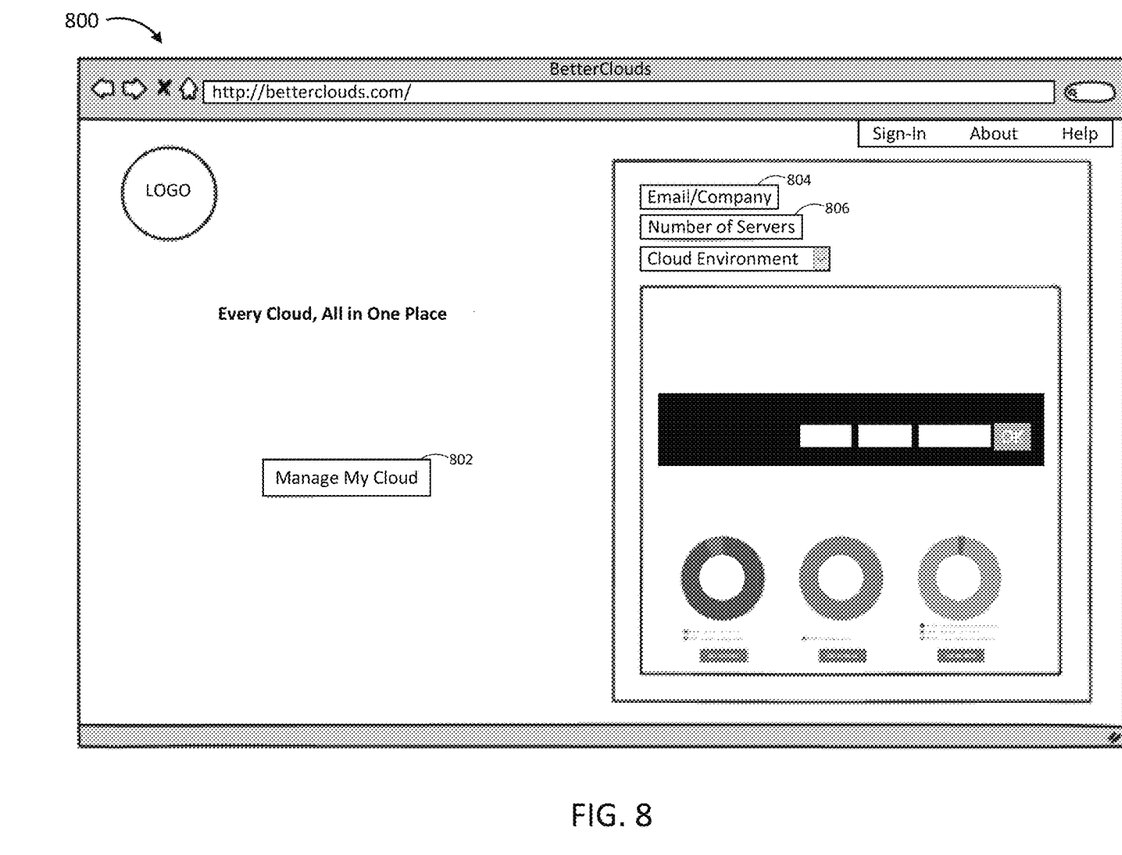
FIG. 8 is an example interface of one embodiment displayed on a user device including graphics displaying predicted losses in revenue, productivity and data based on an analysis of a chosen cloud server service environment.
Figure 9:
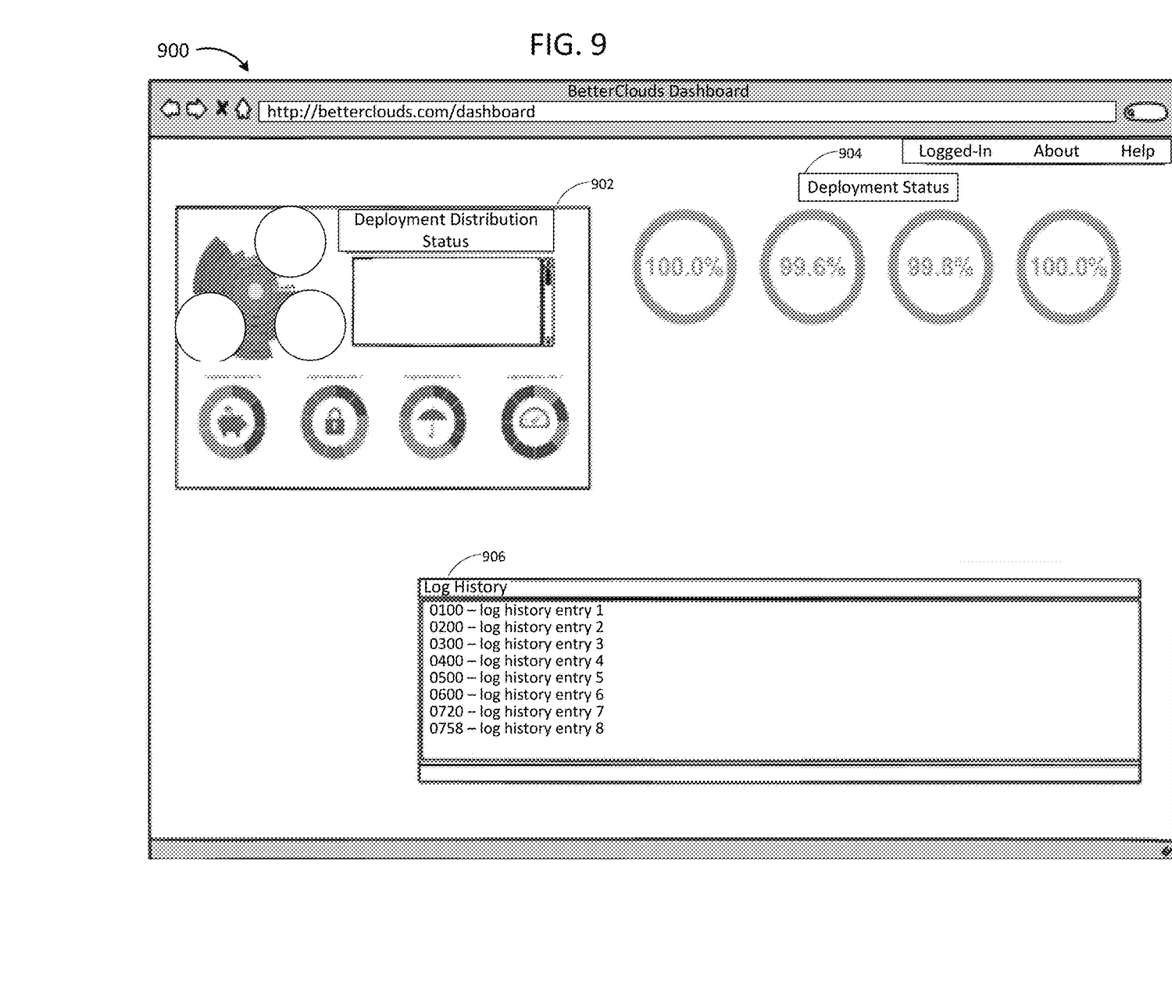
FIG. 9 is an example interface of one embodiment displayed on a user device including graphics displaying deployment status and distribution data.

Referring now to FIG. 8, an example interface of one embodiment displayed on a user device including graphics displaying predicted losses in revenue, productivity and data based on an analysis of a chosen cloud server service environment is depicted. Some depicted components include button 802, textual input 804 and 806, pull down input 808, and display box 810. In some implementations, button 802 labeled 'Manage My Cloud' may take a user to a dashboard interface as depicted in FIG. 9. Textual input 804 allows for input of an email address or Company name. Textual input 806 allows for input of a desired number of servers (e.g., for an application or service). Pull down input 808 allows for the selection of different cloud environments (e.g. Rackspace, Azure, AWS, self-hosted Private etc.). In some implementations, using data gathered from textual input 806, and pull-down input 808 allows for the display in display box 810 of an estimated cost delta for a similar deployment between different cloud environments. Pull down input 808 would be an input to select a customer's current cloud server service, including self-hosted Private, and display box 810 displays an extrapolation of approximate downtime by not using a managed, distributed solution (e.g., name here as BetterClouds). The information in the display box 810 may be based on historical published outage information, and system gathered outage information as they are gathered and documented.

Referring now to FIG. 9, an example interface of one embodiment displayed on a user device including graphics displaying deployment status and distribution data is depicted. Some depicted components include display window 902, deployment status area 904, and log history display window 906. In some implementations, display window 902 displays the current status of a current deployment or deployments of a customer and displays a percentage of a workload of the deployment or deployments across a plurality of cloud server services 106, a per/hour cost for each of the plurality of cloud server services 106 for the deployment or deployments as well as additional detailed information. Additional detailed information may include additional information for each of the cloud server services such as their level of cost optimizing, security, fault tolerance, and performance. Deployment status area 904 may display which features are available or have been added to the deployment and the percentage of up-time each feature (e.g., DNS Services, Email Services, Web App Platform, Database Clusters) has accomplished. Historical information and additional detail (e.g., current status, response time, average response time, etc.) may also be displayed. Buttons allowing the creation, editing, or deletion of such services to the deployment may also be displayed. A log history display window 906 may be displayed to show historical activity and performance of the deployment. Some example log entries may include "Web App Platform Deployment in Amazon West exceeded latency thresholds," "Web App Platform Deployment redeployed in Amazon East due to latency thresholds tolerances exceeded," "Web App Platform Deployment successfully deployed in Amazon East," "Replication of Database Clusters Deployment started between Amazon East and Amazon West," "Email Services Deployment in Rackspace time out exceeded," "Email Services Deployment redeployed in Openstack Seattle due to timeout tolerance exceeded (AUTO)," "Email Services Deployment successfully deployed in Openstack Seattle," "Replication of Database Clusters Deployment complete,"

"Replication of DNS Services Deployment started between Rackspace and Seattle," "Replication of DNS Services Deployment complete," "Login of admin user seattleOPS1," "Logout of admin user seattleOPS1," etc.

Figure 10:
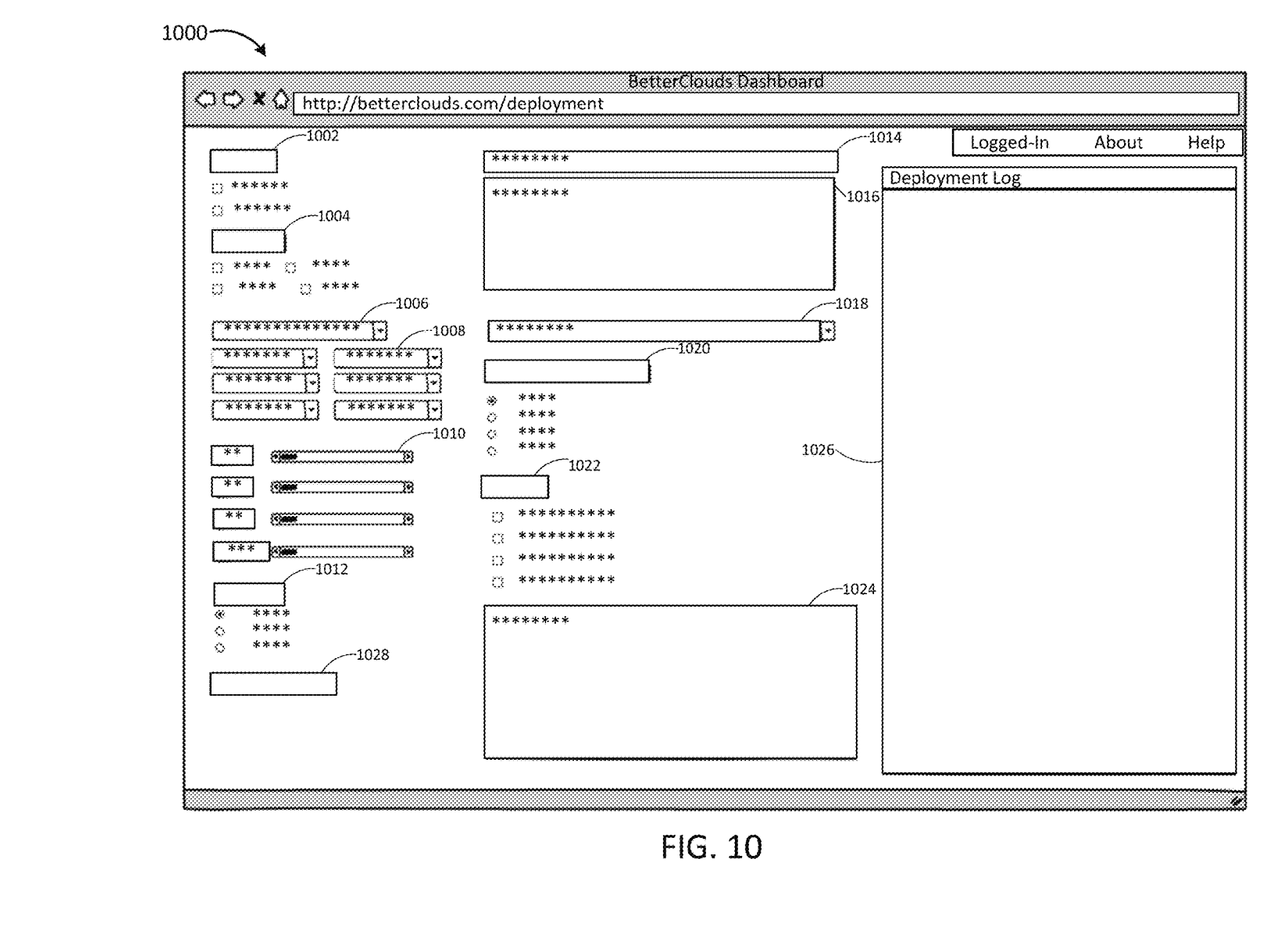
FIG. 10 is an example interface of one embodiment displayed on a user device including graphics displaying available settings and information when launching a new deployment.

Referring now to FIG. 10, an example interface of one embodiment displayed on a user device 1000 including graphics displaying available settings and information when launching a new deployment is depicted. Depicted components include an availability input area 1002, a datacenters input area 1004, a pulldown menu 1006, pull down menus 1008, slide selectors 1010, tie breaker selection area 1012, input boxes 1014 and 1016, pull down menu 1018, container replication frequency area 1020, security input area 1022, information display area 1024, and display log 1026. In some implementations, the availability input area 1002 includes options allowing selection on the availability of the deployment (e.g., Geo-Available, Auto-Failover, etc.) The datacenter input area 1004 includes options allowing selection of different cloud server services 106 (e.g., cloud server services such as Rackspace, Amazon East, Amazon West, Seattle, etc.) The pulldown menu 1006 allows for the selection of a number of servers to be used in the deployment. The pulldown menus 1008 allow for the selection of which customer container images to use for the deployment. The slide selectors 1010 may allow for a display of data regarding estimated metrics based on other selections on the display screen (e.g., price, CPU use, Disk use, Latency, etc.). In some implementations, the values of the slide selectors 1010 can be adjusted up and down and other settings on the display automatically change to compensate to display the consequences of different changes. The tie breaker selection area 1012 allows for discretion in the choice of priority when choosing between workload distribution to more than one cloud server service 106 (e.g., Price, Performance, Uptime, etc.). Input box 1014 allows the input of a name for the deployment. Input box 1016 allows the input of a description for the deployment. Pull down 1018 allows for the selection of save application profiles to populate some of the selections on the display. Container replication frequency area 1020 allows for the selection of a set period of time when containers between cloud server services 106 are synchronized for a given deployment. Security input area 1022 allows for various security selection related to the deployment (e.g., Install Default Credentials, Traffic Monitoring/Analysis, Firewall Enabled, System Integrity Checks, etc.). Information display area 1024 allows for additional information to display regarding the selections that have been made for the deployment. Display log 1026 allows for the display of events during deployment once the launch button 1028 is selected. In some implementations, logged events may include such events as "Creation of Deployment Name started," "Selection process for optimal placement started," "Selection process for optimal placement complete! RACKSPACE," "Uploading container image 1 . . . 6 to Rackspace," "Upload of container images 1 . . . 6 to Rackspace COMPLETE," "Replication of container images to Amazon East started," "Replication of container images to Amazon West started," "Launching containers 1 . . . 6 in Rackspace," "Container 1 launch complete in Rackspace, installing security profile," "Container 1 security profile installed, status changed to ACTIVE," "Replication complete of container 1 to Amazon East—status SYNCED," "Snapshot of container 1 complete," "Replication of snapshot for container 1 started to Amazon East," "Replication of snapshot for container 1 started to Amazon West," etc.

Various embodiments are described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, are intended to encompass implementations using one or more lines of software code, and/or hardware implementations, and/or equipment for receiving manual inputs.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made by one of ordinary skill in the art without departing from the spirit and scope of the appended claims. All implementations that come within the spirit and scope of the following claims and equivalents thereto are claimed.

What is claimed is:

1. A method comprising:
   transmitting a plurality of deployments, each of the deployments adapted for executing using a respective cloud server service of a plurality of cloud server services, the plurality of deployments comprising instructions that when executed by the respective cloud server service:
     creates a container within an instance running using the respective cloud server service, wherein the instance is configured to provide one or more parameters to the container for controlling one or more metrics for deployment;
     monitors the performance of the deployment by comparing the one or more metrics with a respective threshold value;
     receives a request comprising information associated with the deployment; and
     updates a parameter associated with the deployment based on the received request, wherein the parameter is associated with one of bandwidth, latency, processing capability, or computer memory of the container;
   receiving a first request comprising information associated with changing one or more of the plurality of deployments, wherein the information associated with changing one or more of the plurality of deployments comprises an image of data needed to load the respective container;
   determining one or more of the plurality of deployments to change based on the first request, wherein at least one of the plurality of deployments does not meet a threshold value of at least one metric; and
   transmitting a respective request to the one or more of the plurality of deployments based on the determination, the respective request causing the one or more of the plurality of deployments to update the parameter.

2. The method of claim 1, wherein determining the one or more of the plurality of deployments to change based on the first request comprises application of a machine learning algorithm to the first request.

3. The method of claim 2, wherein the machine learning algorithm accesses at least one metric from a group comprising cost, performance, reliability and time to deliver and analyzing the received request comprising information comprises:
   comparing each of the one or more of the plurality of deployments to the at least one metric; and
   determining the respective one or more of the plurality of deployments does not meet a threshold value of the at least one metric.

4. The method of claim 1, wherein each of the plurality of deployments further comprises instructions executed by the respective cloud server service to:
   receive a second request comprising information associated with changing one or more of the plurality of deployments; and
   alter a parameter associated with the instance based on the analysis of the second received request.

5. The method of claim 4, wherein the parameter associated with the instance is at least one of bandwidth, latency, processing capability, or computer memory.

6. The method of claim 1, wherein a plurality of the plurality of deployments comprise an image associated with the container and synchronize updates to the image associated with the container between the plurality of the plurality of deployments.

7. A system comprising: one or more processors;
   a network interface; and
   a computer storage device storing instructions, when executed by the one or more processors, cause the one or more processors to perform operations comprising:
   transmitting, via the network interface, a plurality of deployments, each of the deployments adapted for executing using a respective cloud server service of a plurality of cloud server service, each of the plurality of deployments comprising instructions to:
     create a container within an instance running using the respective cloud server service, wherein the instance is configured to provide one or more parameters to the container for controlling one or more metrics for deployment;
     monitor the performance of the deployment by comparing the one or more metrics with a respective threshold value;
     receive a request comprising information associated with the deployment; and
     update a parameter associated with the deployment based on the received request wherein the parameter is associated with one of bandwidth, latency, processing capability, or computer memory of the container;
   receiving a first request comprising information associated with changing one or more of the plurality of deployments, wherein the information associated with changing one or more of the plurality of deployments comprises an image of data needed to load the respective container;
   determining one or more of the plurality of deployments to change based on the first request, wherein at least one of the plurality of deployments does not meet a threshold value of at least one metric; and
   transmitting, via the network interface, a respective request to the one or more of the plurality of deployments based on the determination, the respective request causing the one or more of the plurality of deployments to update the parameter.

8. The system of claim 7, wherein determining the one or more of the plurality of deployments to change based on the first request comprises application of a machine learning algorithm to the first request.

9. The system of claim 8, wherein the machine learning algorithm accesses at least one metric from a group comprising cost, performance, reliability and time to deliver and analyzing the received request comprising information comprises:

comparing each of the one or more of the plurality of deployments to the at least one metric; and determining the respective one or more of the plurality of deployments does not meet a threshold value of the at least one metric.

10. The system of claim 7, wherein each of the plurality of deployments further comprises instructions executed by the respective cloud server service to:

receive a second request comprising information associated with changing one or more of the plurality of deployments; and alter a parameter associated with the instance based on the analysis of the second received request.

11. The system of claim 10, wherein the parameter associated with the instance is at least one of bandwidth, latency, processing capability, or computer memory.

12. The system of claim 7, wherein a plurality of the plurality of deployments comprise an image associated with the container and synchronize updates to the image associated with the container between the plurality of the plurality of deployments.

13. A non-transitory computer-readable medium having stored computer-executable instructions that, when executed by one or more processors of a computer system cause the computer system to perform a process comprising:

transmitting a plurality of deployments, each of the deployments adapted for executing using a respective cloud server service of a plurality of cloud server services, the plurality of deployments comprising instructions that when executed by the respective cloud server service:

creates a container within an instance running using the respective cloud server service, wherein the instance is configured to provide one or more parameters to the container for controlling one or more metrics for deployment;

monitors the performance of the deployment by comparing the one or more metrics with a respective threshold value;

receives a request comprising information associated with the deployment; and updates a parameter associated with the deployment based on the received request, wherein the parameter is associated with one of bandwidth, latency, processing capability, or computer memory of the container;

receiving a first request comprising information associated with changing one or more of the plurality of deployments, wherein the information associated with changing one or more of the plurality of deployments comprises an image of data needed to load the respective container;

determining one or more of the plurality of deployments to change based on the first request wherein at least one of the plurality of deployments does not meet a threshold value of at least one metric: and transmitting a respective request to the one or more of the plurality of deployments based on the determining, the respective request causing the one or more of the plurality of deployments to update the parameter.

14. The non-transitory computer-readable medium of claim 13, wherein determining the one or more of the plurality of deployments to change based on the first request comprises application of a machine learning algorithm to the first request.

15. The non-transitory computer-readable medium of claim 14, wherein the machine learning algorithm accesses at least one metric from a group comprising cost, performance, reliability and time to deliver and analyzing the received request comprising information comprises:

comparing each of the one or more of the plurality of deployments to the at least one metric; and determining the respective one or more of the plurality of deployments does not meet a threshold value of the at least one metric.

16. The non-transitory computer-readable medium of claim 13, wherein each of the plurality of deployments further comprises instructions executed by the respective cloud server service to:

receive a second request comprising information associated with changing one or more of the plurality of deployments; and alter a parameter associated with the instance based on the analysis of the second received request.

17. The non-transitory computer-readable medium of claim 16, wherein the parameter associated with the instance is at least one of bandwidth, latency, processing capability, or computer memory.

* * * * *